(12) United States Patent
Pöltinger et al.

(10) Patent No.: US 11,781,583 B2
(45) Date of Patent: Oct. 10, 2023

(54) CENTERING SLEEVE AND FASTENING METHOD

(71) Applicant: SFS intec Holding AG, Heerbrugg (CH)

(72) Inventors: Yves Pöltinger, St. Margrethen (CH); Roland Mair, Vorarlberg (AT)

(73) Assignee: SFS Group International AG, Heerbrugg (CH)

( * ) Notice: Subject to any disclaimer, the term of this patent is extended or adjusted under 35 U.S.C. 154(b) by 46 days.

(21) Appl. No.: 17/460,455

(22) Filed: Aug. 30, 2021

(65) Prior Publication Data

US 2022/0065283 A1    Mar. 3, 2022

(30) Foreign Application Priority Data

Aug. 28, 2020   (EP) .................................... 20193375

(51) Int. Cl.
*F16B 37/00*    (2006.01)
(52) U.S. Cl.
CPC .................... *F16B 37/00* (2013.01)
(58) Field of Classification Search
CPC .......... F16B 43/00; F16B 37/00; E04F 21/18; E04F 13/0832; B23B 49/026
See application file for complete search history.

(56) References Cited

U.S. PATENT DOCUMENTS

| 2003/0059267 | A1* | 3/2003 | Deaton | B23B 49/026 |
| | | | | 408/201 |
| 2003/0108401 | A1* | 6/2003 | Agha | F16B 43/00 |
| | | | | 411/353 |
| 2019/0337129 | A1* | 11/2019 | Mair | E04F 13/0832 |

FOREIGN PATENT DOCUMENTS

| CN | 113513527 A | * 10/2021 |
| EP | 3366934 | 8/2018 |
| WO | 03026823 | 4/2003 |

OTHER PUBLICATIONS

Qin et al.; CN-113513527-A Machine translation (Year: 2021).*

* cited by examiner

*Primary Examiner* — Lee A Holly
(74) *Attorney, Agent, or Firm* — Volpe Koenig

(57) ABSTRACT

A sleeve for the centering of fasteners when installing structural parts on substructure of a building envelope is designed substantially as a hollow cylindrical sleeve body or split hollow cylindrical sleeve body. It has at least two gutter-like shell elements each having a head end and a rear end. The shell elements are grouped symmetrically about a central axis A and span between them a middle space with inner surfaces facing each other. The shell elements are spaced apart from each other and separated by axially parallel longitudinal slots, except for a connecting joint section at the head end. These sleeves are placed on a fastener and allow a precise centering in the predrilled hole of a facade plate, for example. The sleeve remains in the predrilled hole until such time as the centering of the fastener has been accomplished and is then ejected safely by driving the fastener home.

12 Claims, 3 Drawing Sheets

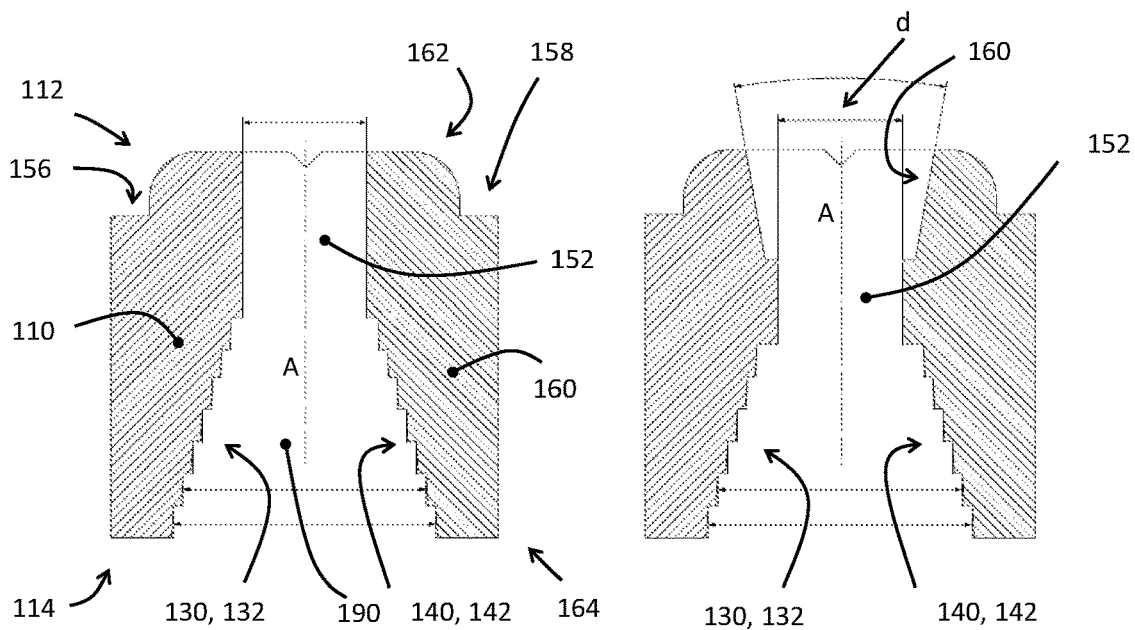
Fig. 4
Fig. 5
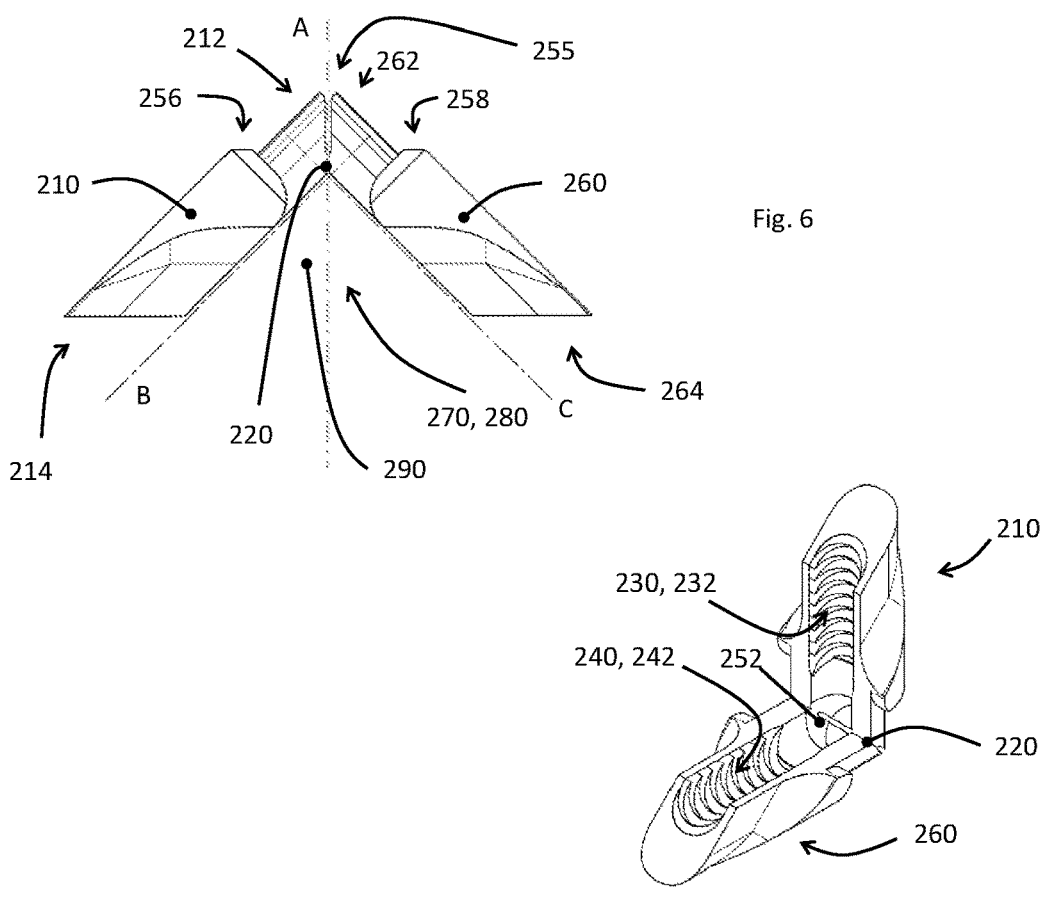
Fig. 6
Fig. 7

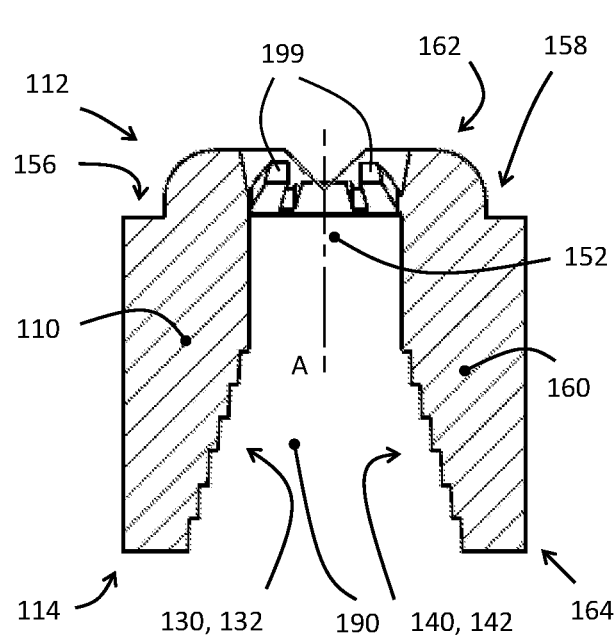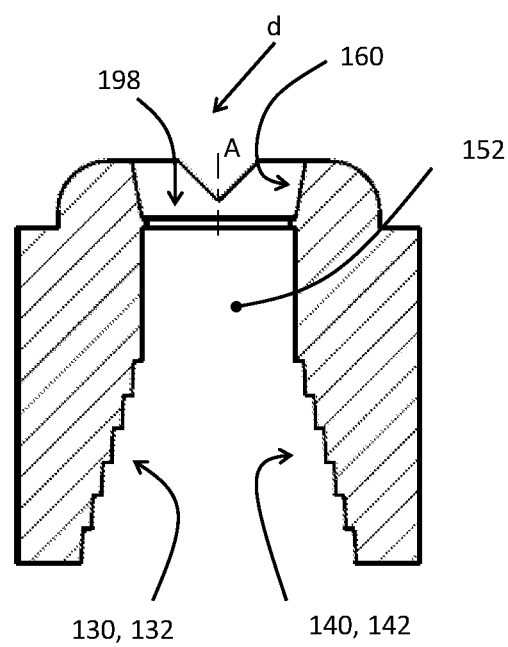
Fig. 8
Fig. 9

CENTERING SLEEVE AND FASTENING METHOD

INCORPORATION BY REFERENCE

The following documents are incorporated herein by reference as if fully set forth: European Patent Application No. 20193375, filed Aug. 28, 2020.

TECHNICAL FIELD

The present invention relates to a centering sleeve for the precise positioning of fasteners when installing structural parts, especially facade plates on a substructure of a building envelope. Moreover, a corresponding method is described.

BACKGROUND

In the field of construction at present, especially office and commercial construction, functional building envelopes are created that must satisfy high demands in regard to safety, transparency, insulation, but also design and maintainability. Especially in the case of a demanding architecture, the technical fastening of facade elements must be done in such a way that the overall image of the building is not negatively affected.

The facade elements used are often colored platelike structural parts, with and without surface structures, and are made from materials such as fiber cement, wood, HPL (high pressure laminate—paper sheets with plastic), plastics, light metal, and compounds or laminates of these materials. The thickness of these plates is usually between 4 and 12 mm, depending on the material and size of the element and the type of fastening. The facade elements are usually the last visible element of the building envelope to be fastened on a substructure, often on a lattice or gridwork made of light metal profiles.

A very common type of fastening such facade elements is visible screw fasteners, in which case the screw heads remain visible as part of the facade. Regardless of the type of fastening, however, one must consider that the facade elements and the substructure are subjected to different thermal stresses, they may have different coefficients of expansion, and therefore they will expand in a different manner. But stresses between individual facade elements or between a facade element and the substructure may cause material fatigue.

This problem is often solved in that the facade elements have through boreholes for the fastening, the diameter of which is chosen to be larger than the nominal outer diameter of the thread of the fastening screws. In this way, each facade element has some play in its fastening plane. Consequently, the head diameter of the screws must be chosen to be significantly larger than the diameter of the boreholes in the facade element, in order to hold the facade element securely in place.

Yet this causes the problem in the mounting of the fastening elements that the oversized borehole in the facade element of the screw may offer no guidance when setting the screw and thus a tilting or misplacing of the screw is possible—which in turn would jeopardize the intended goal of a "fastening with some play". This hazard is further intensified by the fact that self-drilling and self-cutting screws are often used for the installation, which can be set in the metallic substructure without drilling a pilot hole. Hence, a correspondingly large application of force is needed before the drill tip or the thread takes hold.

PRIOR ART

In the prior art, this problem is solved, for example, by inserting a sleeve having a flangelike collar and a bottom into the wide through borehole of the facade element. The outer diameter of the sleeve (without the collar) corresponds basically to the borehole diameter in the facade element and the length of the sleeve to the thickness of the facade element. The bottom may have a central hole, a recess, or a centrally located predetermined breaking point, enabling a centering of the screw once set in place. Depending on how large the free internal diameter of the sleeve is, a guidance effect for the screw can also be achieved. The collar of the sleeve in the finally installed state moreover has a sealing as well as a dampening effect, since the screw head rests on the collar as on a washer. The drawback is that one must provide a correspondingly designed sleeve for each borehole diameter in the facade and for each thickness of facade plate.

Alternatively, document WO 03/026823A1 proposes using a cylindrical guide sleeve which is shoved (twisted or pushed) onto the tip of a screw and which itself has a conical tip pointing in the same direction as the screw tip. This conical tip centers a (usually) countersunk screw in a sunken borehole and ensures that the screw head can be sunk flush in the surface. Once the thread of the screw has taken hold in the substructure and the underside of the screw head comes to bear against the upper edge of the sleeve, the sleeve is separated along a predetermined breaking point parallel with the longitudinal axis and ejected. No portion of the sleeve remains in the borehole.

A further development of this principle is shown by EP 3 366 934 A1, which not only works for conically sunken boreholes but also was designed specifically for use with facade elements. A guide sleeve equipped with predetermined breaking points parallel to the longitudinal axis is placed in the borehole and held there only at the edge of the borehole with the aid of a stop or guide elements. A conical, funnel-shaped opening at the other end of the sleeve ensures that, regardless of the head shape, a screw will break open the sleeve in radially sideways manner once the screw has reached a certain setting depth.

In practice it has been found that such a design of the centering sleeves still has the risk of sleeve remnants getting stuck in the borehole. This may occur in particular when the screw is set at a high feed rate and the sleeve remnants are not ejected fast enough to the side.

SUMMARY

Therefore, the problem which the present invention proposes to solve is to avoid these drawbacks of the prior art, in particular, to make possible a secure and simple mounting of facade elements of the described kind and to allow a centered and guided mounting of the fastening screw.

This is accomplished by a centering sleeve having one or more of the features described herein and by an installation method having one or more of the features described herein. Useful variants and modifications of the invention are described below.

The sleeve according to the invention, like the corresponding sleeves of the prior art, is a product to be used only one time at the start of the installation process, briefly stabilizing (centering and guiding) a fastener, and then being broken off during the further driving home of the fastener and no longer standing in the way of the final screwing process. The drawbacks of the prior art are avoided thanks to a particular design of the sleeve and the resulting unique performance of the process.

A sleeve according to the invention serves for the centering of fasteners when installing structural parts on the substructure of a building envelope. It comprises a substantially hollow cylindrical sleeve body or split hollow cylindrical sleeve body having at least two gutter-like shell elements. Each of these has a head end and a rear end (relative to the longitudinal axis of the sleeve) and they are grouped symmetrically about a central axis A. They span between them a middle space with inner surfaces facing each other. The shell elements are spaced apart from each other and separated by axially parallel longitudinal slots, except for a connecting joint section situated at the head end. The wording "hollow cylindrical sleeve body" is meant to indicate that the basic shape of the sleeve, viewed from the outside, is formed by a hollow cylinder, the wall of which comprises at least two longitudinal slots, reaching into the middle space. The shell elements form the greater portion of the sleeve, being connected by the joint section at the head end. Two shell elements (i.e., basically half-shells) have proven to be adequate for the function, but the invention would also work with a sleeve body formed from 3, 4, or more shell elements. A multiple divisibility may have benefits, especially in the case of large sleeve diameters.

A "split hollow cylindrical sleeve body" means a structural shape whose shell body design substantially follows the structural shape of the normal sleeve body described above, i.e., being connected together in particular at the joint section, but opened up. The splay angle of a shell element relative to the central axis of the shell may be preferably 15° to 45°. FIGS. 6 and 7 illustrate for example this embodiment of one such sleeve with 2×45° splay angle. If the shell body is moved together (swiveling about the joint section), the sleeve shape is again achieved. The reason for this design is further explained in the section on the use of the sleeve.

Moreover, it is advantageous for the middle space spanned by the inner surfaces of the gutter-like shell elements to have a substantially funnel shape with diameter widening toward the rear end. This funnel shape can be achieved, on the one hand, by having the sleeve designed as a cylinder or close to a cylinder in its outer form, but the middle space departs from the cylinder shape in favor of a conical wall. In the case of the "split hollow cylindrical hollow body", the funnel shape is achieved or supported by the opening up of the shell elements.

Especially preferably, the inner surfaces of the gutter-like shell elements have a stepped stairway or ribbed surface. This shall be explained further in the application section. This ribbed surface may also be arranged on a slant, especially so that a helical (internal) thread is produced. The texture is not confined to ribs or steps, but may also be knurled, knobbed, or irregularly textured.

As described above, a sleeve according to the invention comprises axially parallel longitudinal slots. Viewed from the outside, such a longitudinal slot may preferably have a wedge shape, widening from the head end to the rear end.

Moreover, in a sleeve according to the invention the joint section can be designed as a material bridge with a predetermined breaking point. This embodiment is easy to realize in a manufacturing process. Thanks to the predetermined breaking point, the joining function is achieved at the intended location. The predetermined breaking point can preferably be designed as a notch, a narrowing or a constriction.

In another embodiment, the sleeve or its inner space in the area of the joint section or near the head end has a narrowing in the form of an internally circular tube section with a diameter d. More commonly stated, this would be a bottle neck.

The functionality is explained further below. In one useful variant, the narrowing is adjoined by a funnel-shaped widening toward the head end.

The sleeve may comprise, especially in or near the area of the narrowing, a clamping element. This clamping element supports the clamping effect between sleeve and fastener, inasmuch as it can engage additionally with the thread of the fastener. This clamping effect is primarily advantageous for the period prior to use, i.e., during storage and transport. The clamping effect can be realized by a thin membrane spanning the narrowing. It may be partly pierced, i.e., with a slot or a central opening, for example. Alternatively, a plurality of finger-like holding elements can be provided, reaching into the narrowing and making possible said engagement with the thread of the fastener.

In another embodiment, the sleeve body comprises, at the front end, a set-back stop surface or multiple surfaces (156, 158, 256, 258) forming a stop surface. Set-back means here that portions of the sleeve body extend beyond the stop surface(s). As further explained below, these surfaces support a secure centering and guiding during the installation process.

Sleeves of the described kind can be easily made in large numbers as injection molded or compression molded elements. Especially suitable as the material is plastic, particularly a biodegradable plastic, a pressed and/or bonded fiber material, particularly one based on cellulose, (recycled) paper fibers, plant fibers, or a material blend or composite material made from the aforementioned and other substances. If the sleeves of the invention are intended for a onetime use and are broken up by the installation process, a material not needing to be disposed of separately is advantageous.

A method according to the invention for fastening a facade element on the substructure of a building envelope has the following steps:

a) providing a fastener having a head with a purchase point, a threaded shaft, and a tip. The screw is advantageously self-drilling or self-cutting in design. The tip is then designed as a drilling tip or displacement tip. On this tip of the fastener is placed a sleeve according to the invention. The sleeve sits in clamping manner on the tip or on a thread which may be provided there or on a thread segment near the tip. The clamping occurs in the region of the head end or the narrowing. For this, the diameter d of the narrowing is less than the thread outer diameter of the fastener.

b) The fastener is inserted in a predrilled hole of said facade element, such that the set-back stop surfaces lie against the surface of the facade element. In this way, a precise centering of the fastener in the borehole is achieved.

c) Now the sleeve is pressed against the predrilled hole, so that the inner surfaces come at least partially into contact with the thread on the shaft of the fastener. The pressing has the effect that the conically tapering inner surfaces of the sleeve are folded or pressed inward against the shaft thread, thanks to the joint section.

d) Now, if the fastener is driven forward . . . .

e) the fastener sinks into the predrilled hole until the tip of the fastener reaches the substructure. Until that time, the guidance (centering in the predrilled hole of the facade element) is enabled or facilitated by the sleeve.

f) The shell elements are spontaneously ejected from the predrilled hole of the facade element by simply driving home the fastener, once the centering has been assured. The reason for this is the interplay of the screw thread and the inner surfaces of the sleeve, produced by the sleeve of the invention. For as long as the tip of the fastener has not reached the substructure, the pressing force exerted by the installer is diverted through the sleeve onto the facade plate, which at the same time holds the sleeve in the predrilled hole. The pitch of the thread defines (together with the number of revolutions) the advancement of the fastener. Once the tip touches the substructure, this forward movement is immediately lessened, because the material of the substructure must first be drilled through. But since the fastener continues to turn, the sleeve elements are forced by the thread out from the predrilled hole. This occurs automatically at the moment when the drill tip has been centered and the sleeve has performed its function. In this way . . . .

g) completion of the fastening is achieved, leaving behind no remainder of the sleeve in the resulting fastener—facade element—substructure assemblage.

The problems known in part from the prior art—a sleeve remaining too long in the predrilled hole (risk of jamming or crushing) or being ejected from the predrilled hole before the centering in the substructure was achieved—can be avoided.

Experiments have shown that the joint section may break open as a result of the pressing of the sleeve against the edge of the predrilled hole ((step c) above). This is even encouraged by the funnel shape of the inner space. However, the pressing force of the fastener, even when it is being driven forward, is enough to stabilize the two separate halves in the predrilled hole. Once the centering effect has been achieved as described above, the broken-open halves are also securely ejected.

BRIEF DESCRIPTION OF THE DRAWINGS

The figures show a first embodiment of the invention, partly supplemented with preferred features.

FIGS. 4 and 5 are longitudinal sections through a sleeve according to the invention, FIGS. 6 and 7, show another variant of the sleeve variant, and FIGS. 8 and 9 show a supplemental feature to the embodiment of FIGS. 4 and 5.

DETAILED DESCRIPTION

Figure 1:
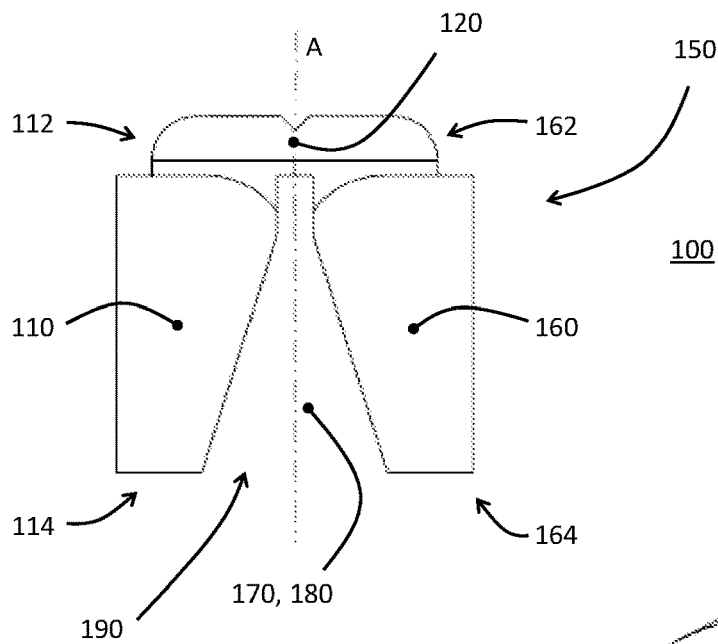
FIG. 1 is a side view.
Figure 2:
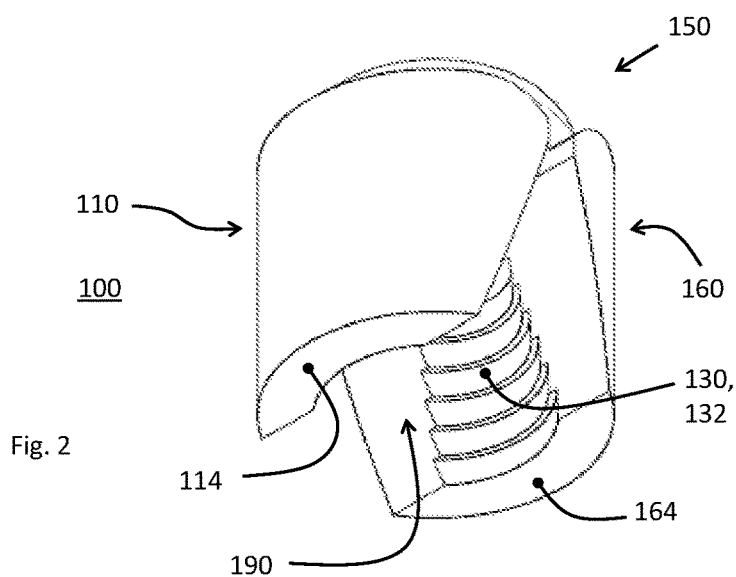
FIGS. 2 and 3 are each a perspective view.
Figure 3:
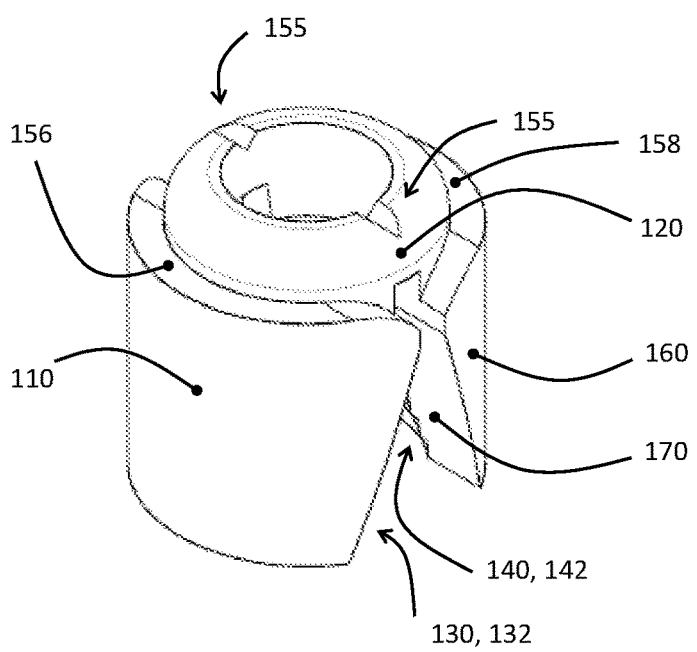

Due to the similar subject matter, FIGS. 1-3 are discussed together.

A sleeve 100 is shown as a substantially hollow cylindrical sleeve body 150. It comprises here two gutter-like shell elements 110, 160 with their head end 112, 162 and rear end 114, 164. The central axis A marks the central axis of symmetry of the cylindrical body. The two gutter-like shell elements 110, 160 are grouped such that their outer surfaces define the outer form of the cylinder. The two shell elements 110, 160 are separated by two axially parallel longitudinal slots 170, 180. The shell elements bound a middle space 190, and the inner surfaces facing each other are marked as 130 and 140. The joint section 120 at the head end 112, 162 connects the two shell elements by a material bridge. This may have a predetermined breaking point 155, shown here in the form of a notch.

FIG. 2 shows in perspective view the rear end 114, 164 and the middle space 190. It can be clearly seen that the inner surface 130 has a stepped stairway or ribbed surface 132.

FIGS. 1 to 3 illustrate that the middle space 190 has a substantially funnel-like form with widening diameter toward the rear end 114, 164. It can likewise be seen that the longitudinal slots 170, 180, viewed from the outside, have a wedge shape. They widen from the head end 112, 162 toward the rear end 114, 164.

Moreover, it can clearly be seen that the sleeve 100 has a set-back stop surface 156, 158 at the front end 112, 162. This is two-piece here, divided between the two shell elements 110, 160. Viewed together, the surfaces form a ring-shaped stop surface. The portion of the sleeve extending beyond the front end 112, 162 has a corresponding centering function when inserted into a predrilled hole. The internal diameter of the stop surface is therefore designed so that it corresponds to the predrilled hole diameter of the facade plate.

In FIGS. 4 and 5, the same reference numbers have the same meaning as in FIGS. 1-3. FIG. 4 shows a transverse section, illustrating the funnel-shaped form of the inner space 190. Moreover, the inner surface 130, 140 is clearly seen as a stepped stairway or ribbed surface 132, 142. The narrowing 152 can be seen in the form of an internally circular tube segment with diameter d, representing the narrowest point of the internal region of the sleeve and serving as an immediate clamping surface for an inserted fastener.

In the variant of FIG. 5, the narrowing 152 is adjoined by a funnel-shaped widening 154 toward the head end.

FIGS. 8 and 9 are based on FIGS. 4 and 5. They have been supplemented with the feature of a "clamping element", which has been introduced in two exemplary variants 198 and 199. The clamping element further supplements the clamping effect achieved by the narrowing 152. While an inserted fastener is primarily held in the narrowing by friction, an additional element such as a membrane 198, a partially pierced membrane or finger-like holding elements 199 can intensify this effect in that these elements engage with the thread of the fastener in locking or latching manner.

The membrane is pierced when the sleeve is placed on the fastener and thereby conforms to the outer contour of the thread. Thus, it forms a protection against dropping out. The alternatively represented finger-like holding elements 199 are preferably formed in a plurality and arranged symmetrically about the central axis A. As described, the clamping element is designed so that it can securely perform the holding function, but does not impede the setting of the fastener in place or the centering effect of the sleeve.

In FIGS. 6 and 7, the sleeve variant "split hollow cylindrical sleeve body" 250 is shown. This likewise has at least two gutter-like shell elements 210, 260, and these likewise have a head end 212, 262 and a rear end 214, 264. The central axis A is shown in FIG. 6. The inner space 290 is enclosed by the folded-open inner surfaces 230, 240, having a funnel shape from the front end 212, 262 toward the rear end 214, 264.

The axially parallel longitudinal slots 270, 280 can be visualized as the surface bounded roughly by the lines B and C in FIG. 6. They have the funnel or wedge shape clearly seen in FIG. 6. The joint section 220 is shown in FIGS. 6 and 7. FIG. 7 shows the stepped stairway or ribbed surface 232, 242 of the inner surfaces 230, 240 of the gutter-like shell elements 210, 260.

This variant embodiment also has a joint section 220, designed as a material bridge, having a predetermined breaking point 255.

The set-back stop surfaces 256, 258 in this variant embodiment are designed as very narrow supporting strips.

The invention claimed is:

1. A sleeve for the centering of fasteners when installing structural parts on substructure of a building envelope, the sleeve comprising:
    a hollow cylindrical sleeve body or split hollow cylindrical sleeve body having at least two gutter-shaped shell elements, each having:
        a head end and a rear end,
        the at least two gutter-shaped shell elements are grouped symmetrically about a central axis A, and
        inner surfaces facing each other in a middle space spanning between them; and
    the shell elements are spaced apart from each other and separated by axially parallel longitudinal slots except for a connecting joint section at the head end;
    wherein the middle space spanned by the inner surfaces of the gutter-shaped shell elements has a funnel shape with a diameter widening toward the rear end.

2. The sleeve as claimed in claim 1, wherein the inner space in the area of the joint section or near the head end has a narrowing in formed as an internally circular tube section with a diameter d.

3. The sleeve as claimed in claim 2, wherein the narrowing is adjoined by a funnel-shaped widening toward the head end.

4. The sleeve as claimed in claim 2, further comprising, in or near an area of the narrowing, a clamping element comprised of a membrane, a partially pierced membrane, or finger-shaped holding elements.

5. The sleeve as claimed in claim 1, wherein the joint section comprises a material bridge with a predetermined breaking point.

6. The sleeve as claimed in claim 5, wherein the predetermined breaking point comprises a notch, a narrowing, or a constriction.

7. The sleeve as claimed in claim 1, wherein the inner surfaces of the gutter-shaped shell elements have a stepped stairway or ribbed surface.

8. The sleeve as claimed in claim 1, wherein one said longitudinal slot has a wedge shape, as viewed from an outside, and widens from the head end to the rear end.

9. The sleeve as claimed in claim 1, wherein the sleeve body comprises, at a front end, a set-back stop surface or multiple surfaces forming a stop surface.

10. The sleeve as claimed in claim 1, wherein the sleeve is a one-piece injection molded or compression molded element.

11. The sleeve as claimed in claim 1, wherein the sleeve comprises a plastic, a biodegradable plastic, bonded paper fibers, plant fibers, or a composite material.

12. A method for fastening a facade element on a substructure of a building envelope, the method comprising the following steps:
    a) providing a fastener having a head with a purchase point, a threaded shaft, and a tip, with a sleeve placed on the tip of the fastener, the sleeve including a hollow cylindrical sleeve body or split hollow cylindrical sleeve body having at least two gutter-shaped shell elements, each having a head end and a rear end, the at least two gutter-shaped shell elements being grouped symmetrically about a central axis A, and inner surfaces facing each other in a middle space spanning between them, the shell elements are spaced apart from each other and separated by axially parallel longitudinal slots except for a connecting joint section at the head end, and the middle space spanned by the inner surfaces of the gutter-shaped shell elements has a funnel shape with a diameter widening toward the rear end;
    b) inserting the fastener in a predrilled hole of said facade element, such that flange-shaped stop surfaces of the sleeve lie against a surface of the facade element;
    c) pressing the sleeve against the predrilled hole, so that the inner surfaces come at least partially into contact with the thread on the shaft of the fastener;
    d) driving the fastener forward;
    e) sinking the fastener into the predrilled hole until the tip of the fastener reaches the substructure, the sleeve accomplishing a centering of the fastener in the predrilled hole of the facade element;
    f) spontaneous ejecting of the shell elements from the predrilled hole of the facade element by driving home the fastener, once the centering has been assured;
    g) completion of the fastening, leaving behind no remainder of the sleeve in a resulting fastener—facade element—substructure assemblage.

* * * * *